Nov. 5, 1968

E. ROSS ET AL 3,409,535

ELECTROCHEMICAL MACHINING APPARATUS HAVING EXTENSIBLE
AND CONTRACTIBLE ELECTROLYTE CHAMBER

Filed March 17, 1965

INVENTORS
EDWARD ROSS
EDWARD CLIVE ALLEN

ATTORNEY

INVENTORS
EDWARD ROSS
EDWARD CLIVE ALLEN

ATTORNEY

United States Patent Office 3,409,535
Patented Nov. 5, 1968

3,409,535
ELECTROCHEMICAL MACHINING APPARATUS HAVING EXTENSIBLE AND CONTRACTIBLE ELECTROLYTE CHAMBER
Edward Ross, Headington, Oxford, and Edward Clive Allen, Cowley, Oxford, England, assignors, by mesne assignments, to Anocut Engineering Company, Elk Grove Village, Ill., a corporation of Illinois
Filed Mar. 17, 1965, Ser. No. 440,569
5 Claims. (Cl. 204—224)

ABSTRACT OF THE DISCLOSURE

An electrochemical machining apparatus is defined by a chamber of varying length through which electrolyte passes. The bottom of the chamber is apertured and rests on top of the workpiece. An electrode is carried by the top wall of the chamber and is aligned with the aperture in the bottom wall. The top of the chamber moves up and down, thus varying the distance from the electrode to the workpiece, to permit the electrode to pass through the aperture in the bottom wall of the chamber for machining a workpiece. In the embodiments disclosed, electrolyte passes into the chamber through apertures in the top wall which are exterior of the electrode, and then out of the chamber through the space defined between the electrode and the aperture in the bottom of the chamber, to flow between the electrode and the workpiece for electrolytic machining. The pressurized electrolyte then passes to the exterior through a hole drilled in the workpiece. In one embodiment disclosed, the side walls of the chamber are formed in a flexible bellows shape, thus rendering the chamber expansible and contractible.

---

This invention relates to apparatus for electrochemical machining.

The object of the invention is to provide apparatus which serves to ensure that, in operation, a workpiece is submerged in electrolyte which may be maintained at a controlled pressure.

According to the invention, electrochemical machining apparatus includes a chamber enclosing an electrode, at least part of a workpiece and an electrolyte which flows at controlled pressure through the chamber and between the electrodes and workpiece, the chamber being so arranged that with relative movement between the electrode and the workpiece an equivalent change occurs in the effective length of the chamber.

Preferably the chamber is extendible and contractible longitudinally and it may be formed from or include a flexible bellows, or it may be formed from rigid hollow members, such as cylinders, which may be interconnected telescopically or connected one to another by a flexible diaphragm; alternatively, the chamber may comprise a rigid hollow member within which a plate is adapted to slide.

If the longitudinally extendible and contractible chamber is directly or indirectly in contact at its ends with the platens, it will be understood that when the platens of the machine are oppositely charged the chamber must be of electrically insulating material or be provided with insulation to prevent short-circuiting between the platens and spurious machining by exposed negatively charged parts. Thus, when the chamber comprises or includes a flexible bellows or diaphragm, the bellows or diaphragm may conveniently be formed from an electrically insulating material which is also impervious to the electrolyte; and when the chamber comprises telescopically interconnected conducting members, an electrolyte seal provided between the, or each, sliding interface may conveniently be electrically insulating.

If the chamber includes a rigid hollow member—such as a metallic cylinder—connected at one end to a movable ram or platen, the other end may conveniently carry a plate on which a machining electrode may be mounted, and, moreover, the plate may carry the electrolyte sealing means; alternatively, the electrode may be mounted on the platen, or a plate secured thereto.

Figure 1:
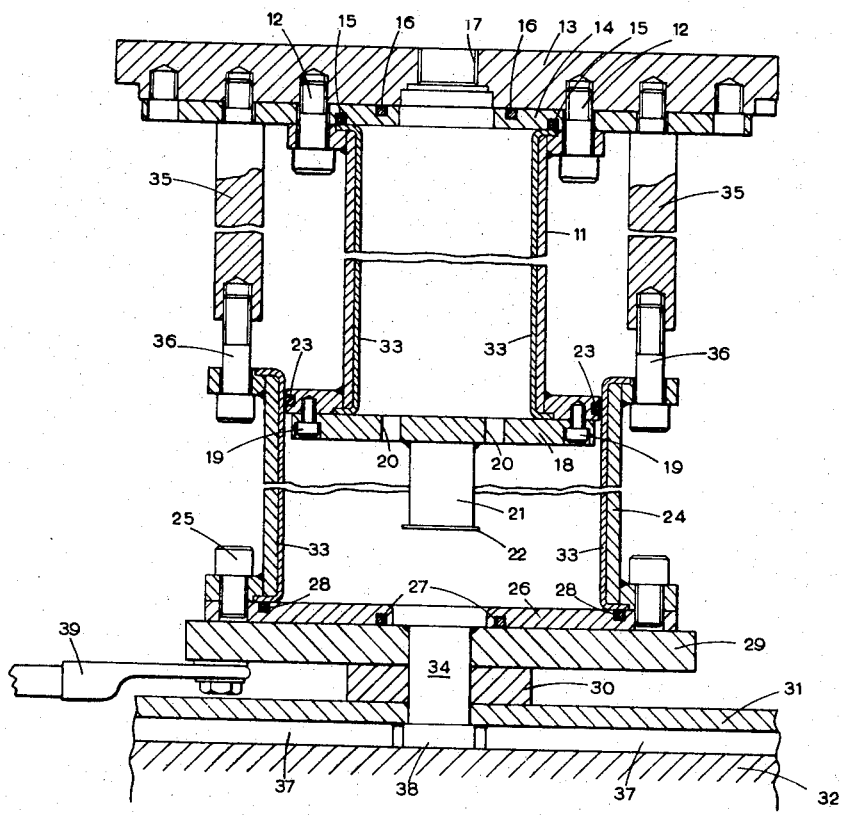
Figure 2:
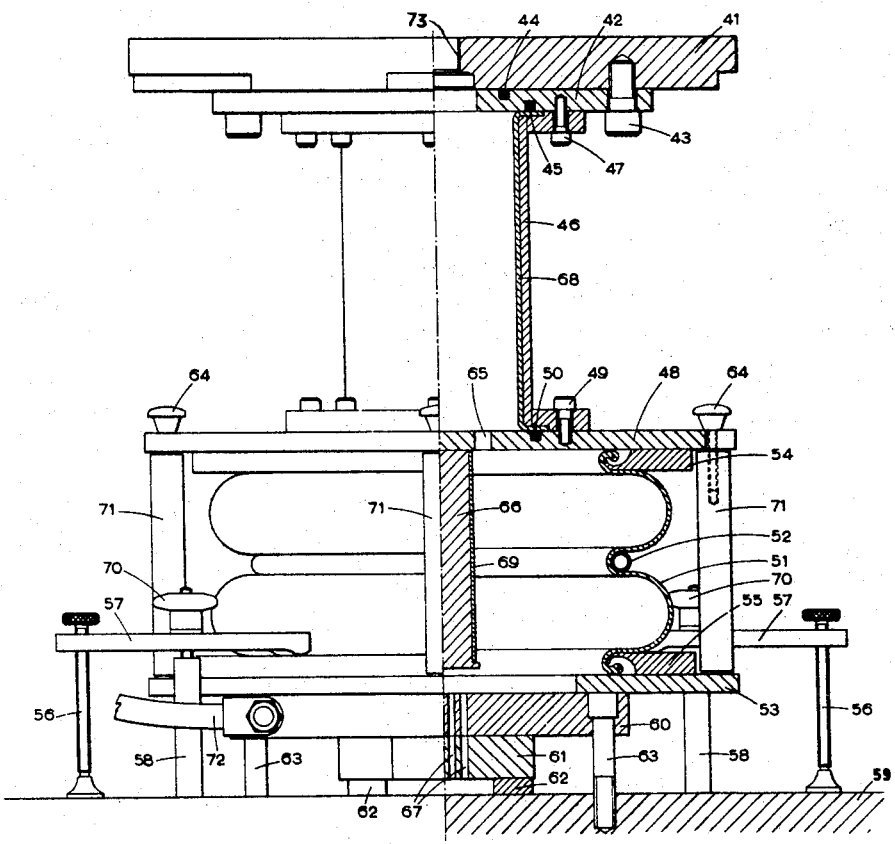

An exemplary form of the invention is described with reference to the accompanying drawings in which:

FIGURE 1 is a sectional elevation of an apparatus for electrochemical machining, FIGURE 2 is a half sectional elevation of an alternative apparatus for electrochemical machining.

Referring to FIGURE 1, the apparatus includes a first cylinder 11 which is secured by bolts 12 to the upper platen or ram 13 of a known electrochemical machining machine. A plate 14 is interposed between the cylinder 11 and the platen 13, and the plate carries sealing rings 15 and 16 for preventing the escape of electrolyte which may be passed through an aperture 17 in the platen 13. A disc 18 is secured to the lower end of the cylinder 11 by bolts 19, and the disc which includes electrolyte passages 20, carries an electrode 21 having a machining portion 22. The lower end of the cylinder 11 carries a sealing ring 23 engaging a second cylinder 24 which is secured by bolts 25 to a plate 26 carrying sealing rings 27 and 28. The plate 26 rests on a workpiece comprising portions 29 (e.g. a bolster) and 30, (e.g. a die block) and the workpiece 29 and 30 is supported by a packing piece 31 which rests on a lower platen or worktable 32. The piece 31 may be formed from an insulating material in order to prevent electrochemical erosion of and mechanical damage to the platen 32.

The inner surfaces of the cylinders 11 and 24 are coated with an electrically insulating layer 33 which also serves to protect the cylinder material from chemical and electrochemical corrosion.

The workpiece 29 and 30 contains a precut aperture 34 which is formed by flame-cutting and which whilst being smaller than the aperture that is to be machined, corresponds in shape thereto. Furthermore, the workpiece 29 and 30 is connected by a cable 39 to the positive terminals of the electric power unit of the machine.

Lifting tie rods 35, formed from an electrically insulating plastics material are secured into the upper platen 13, and each rod 35 supports a bolt 36 having a shank portion which slides in suitable holes formed in a flange on the upper end of the cylinder 24.

In operation, the upper platen 13 of the machine is lowered until the plate 26 contacts the workpiece 29. Thereafter further lowering of the platen, to bring the machining portion 22 of the electrode 21 into a cutting position, causes the cylinder 11 to telescope into the cylinder 24, and the shanks of the bolts 36 to slide in the holes in the upper end of cylinder 24.

Electrolyte is then pumped through the aperture 17 into the cylinder 11, and so through the passages 20 into the cylinder 24. Thus, pressure of the electrolyte acting on the upper surface of plate 26 forces the plate against the workpiece 29 distorts the sealing ring 27, and effects an electrolyte seal between the plate 26 and the workpiece. Thereby the electrode 21 and the portion of the workpiece 29 and 30 which is to be machined becomes submerged in electrolyte which is allowed to escape into a circular chamber 38 discharging through channels 37 formed in the surface of the platen 32; the channels 37 are provided with flow restrictor means, such as an orifice plate, or flow control valves (not shown).

The power supply of the machine is switched on thereby connecting the upper platen 13 to the negative terminal and the lower platen 32 and the workpiece 29 and 30 to the positive terminal of the supply. Thus, whilst the workpiece 29 and 30 is connected to the positive terminal of the supply and the electrode 21 is connected to the negative terminal through the cylinder 11 and the disc 18, the insulating layer 33 on the cylinder 24 and the insulating tie rods 35 prevent a short circuit occurring through the apparatus.

The platen 13 is fed down so that the machining portion 22 of the electrode 21 effects the required removal of metal from the workpiece 29 and 30.

If it is required to examine the work during machining, the upper platen is raised, thereby withdrawing the electrode 21 from the work and causing the cylinder 11 to telescope outwardly in relation to the cylinder 24; however, when the heads of the bolts 36 contact the cylinder 24, the tie rods 35 will lift the cylinder 24 clear of the work, breaking the electrolyte seal between the plate 26 and the workpiece 29, and thereby allowing the work to be examined.

FIGURE 2 shows an alternative form of the invention wherein an upper platen or ram 41 of a known electrochemical machining machine supports a plate 42 which is bolted thereto by bolts 43 and which carries sealing rings 44 and 45. The sealing ring 44 ensures an electrolyte seal between the plate 42 and the platen 41, and the sealing ring 45 ensures an electrolyte seal between the plate 42 and a cylinder 46 which is secured, at one end, to the plate 42 by bolts 47. A disc 48 which supports an electrode 66 is secured to the other end of the cylinder 46 by bolts 49, and a ring seal 50 is arranged to provide an electrolyte seal between the cylinder 46 and the disc 48.

A flexible insulating bellows 51, fitted with a tubular ring 52, is located between the disc 48 and a sealing flange 53, and the upper end of the bellows 51 is clamped to the disc 48 by a lipped ring 54 secured to the disc 48 by bolts (not shown). A similar lipped ring 55 clamps the lower end of the bellows 51 to the flange 53 by means of four clamping devices each comprising an adjustable prop 56, a bar 57, and a tie rod 58 which is screwed at one end to a lower platen or worktable 59 on the machine and has a hand nut 70, for effecting clamping, screwed on the other end.

The flange 53 is supported on a workpiece which comprises a portion 60 and a portion 61 resting on packing pieces 62 and bolted to the lower platen 59 of the machine by bolts 63. The workpiece 60 and 61 is connected to the electric power unit of the machine by a cable 72.

Four stop bars 71 are each fixed by a hand nut 64 between the disc 48 and the flange 53, and serve to support the disc 48 when the tool is being stored and during setting up of the tool on the machine. The bars 71 are, of course, removed before a machining operation commences.

Electrolyte may be pumped through an aperture 73 formed in the platen 41 into the cylinder 46 and thence through ports 65 formed in the disc 48 into the bellows 51 so as to submerge the electrode 66 and escape through drillings 67 in the workpiece 60 and 61. Alternatively, where the restriction to electrolyte flow imposed by the drillings 67, is unsatisfactory the packing pieces 62 may be adapted to provide the necessary restriction.

The inner surface of the cylinder 46 is coated with a protective layer 68 serving to prevent the electrolyte corroding the cylinder, and, furthermore, the outer surface of the electrode 66 is coated with an electrically insulating layer 69 in order to prevent the coated surface acting as a cutting portion of the electrode and also to prevent corrosion by the electrolyte. Other surfaces exposed to electrolyte may also be coated with a protective layer (not shown) to prevent corrosion and spurious electrochemical erosion.

In operation, the workpiece 60 and 61 is bolted to the lower platen 59 and the flange 53 is placed on the workpiece as shown. The upper platen 41 is lowered until the cutting portion of the electrode 66 is within a few thousandths of an inch of the workpiece 60. The clamping devices are applied to secure the bellows 51 to the disc 53, electrolyte is pumped through the tool as described above, and the electric power supply is switched on. Electrochemical machining is effected by controlled downward movement of the electrode in known manner.

What is claimed is:
1. In electrochemical machining apparatus, a longitudinally extensible and contractible chamber formed by a pair of opposed walls which are longitudinally movable relative to each other, and a flexible sleeve, each end of said sleeve being attached to a separate opposed wall to define said chamber within said sleeve and between said walls, one of said opposed walls carrying a machining electrode, said electrode extending into said chamber, and said other opposed wall defining an aperture to permit the electrode to pass through said aperture in spaced relation with said other opposed wall to engage a workpiece for electrochemical machining, and means for passing liquid electrolyte through said chamber and between said electrode and workpiece.

2. The apparatus of claim 1 in which said flexible sleeve is convoluted to form a bellows which expands and contracts as said opposed walls move relative to each other.

3. The apparatus of claim 1 in which said flexible sleeve is adapted to resist hydrostatic pressure from within said chamber.

4. The apparatus of claim 1 in which said opposed wall which carries the machining electrode also defines at least one aperture exterior of said electrode to provide an electrolyte connection with said chamber.

5. The apparatus of claim 1 in which the opposed wall which carries the machining electrode also carries, on its side which faces away from said chamber, a rigid sleeve mounted on one end thereof; the other end of said rigid sleeve being mounted to a platen which is movable along a longitudinal axis.

References Cited

UNITED STATES PATENTS

| 3,223,610 | 12/1965 | Inoue | 204—224 |
| 3,254,013 | 5/1966 | Williams | 204—225 XR |
| 3,271,283 | 9/1966 | Clifford et al. | 204—224 XR |
| 3,354,073 | 11/1967 | Williams et al. | 204—143 XR |

HOWARD S. WILLIAMS, *Primary Examiner.*

D. R. VALENTINE, *Assistant Examiner.*

Dedication 3,409,535.—*Edward Ross*, Headington, Oxford, and *Edward Clive Allen*, Cowley, Oxford, England. ELECTROCHEMICAL MACHINING APPARATUS HAVING EXTENSIBLE AND CONTRACTIBLE ELECTROLYTE CHAMBER. Patent dated Nov. 5, 1968. Dedication filed Dec. 23, 1971, by the assignee, *Anocut Engineering Company*.

Hereby dedicates to the Public the portion of the term of the patent subsequent to Dec. 24, 1971.

[*Official Gazette December 5, 1972.*]